(12) United States Patent
Park et al.

(10) Patent No.: US 10,217,976 B2
(45) Date of Patent: Feb. 26, 2019

(54) SECONDARY BATTERY AND SECONDARY BATTERY PACK INCLUDING THE SAME

(71) Applicant: SAMSUNG SDI CO., LTD., Yongin-si, Gyeonggi-do (KR)

(72) Inventors: Insoo Park, Yongin-si (KR); Daeyon Moon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 548 days.

(21) Appl. No.: 14/630,983

(22) Filed: Feb. 25, 2015

(65) Prior Publication Data

US 2016/0126511 A1    May 5, 2016

(30) Foreign Application Priority Data

Nov. 3, 2014  (KR) .................. 10-2014-0151591

(51) Int. Cl.
*H01M 2/04*   (2006.01)
*H01M 2/02*   (2006.01)
(Continued)

(52) U.S. Cl.
CPC ....... *H01M 2/0404* (2013.01); *H01M 2/0217* (2013.01); *H01M 2/1061* (2013.01);
(Continued)

(58) Field of Classification Search
None
See application file for complete search history.

(56) References Cited

U.S. PATENT DOCUMENTS

2009/0246621 A1* 10/2009 Miebori ............ H01M 2/0212
                                                                429/179
2011/0151287 A1   6/2011 Baek
(Continued)

FOREIGN PATENT DOCUMENTS

EP    2 073 295 A2    6/2009
EP    2073295 A2 *   6/2009  .............. H01M 2/30
(Continued)

OTHER PUBLICATIONS

Extended European Search Report dated Aug. 12, 2015 in Corresponding European Patent Application No. 15173388.8.
(Continued)

*Primary Examiner* — Daniel S Gatewood
(74) *Attorney, Agent, or Firm* — Lee & Morse P.C.

(57) ABSTRACT

A secondary battery, includes a bare cell including an upper surface having an electrode terminal and side surfaces perpendicular to the upper surface; and a first coverlay and a second coverlay electrically connected to the bare cell, the side surfaces including a pair of first side surfaces that are in parallel with each other, and a pair of second side surfaces connecting the pair of first side surfaces to each other and having a smaller area than that of the pair of first side surfaces, the first coverlay including a first region on the upper surface, and a second region bent perpendicularly from the first region and on one of the pair of the second side surfaces, the second coverlay including a third region on the first region, and a fourth region bent perpendicularly from the third region and on the second region.

17 Claims, 4 Drawing Sheets

(51) Int. Cl.
  *H01M 2/10* (2006.01)
  *H01M 2/20* (2006.01)
  *H01M 10/42* (2006.01)
  *H01M 2/30* (2006.01)
  *H01M 10/04* (2006.01)

(52) U.S. Cl.
  CPC ............ *H01M 2/20* (2013.01); *H01M 2/204* (2013.01); *H01M 2/30* (2013.01); *H01M 10/0431* (2013.01); *H01M 10/425* (2013.01); *H01M 10/4257* (2013.01); *H01M 2200/00* (2013.01); *H01M 2200/10* (2013.01); *H01M 2200/101* (2013.01); *H01M 2200/103* (2013.01); *H01M 2200/106* (2013.01); *H01M 2220/30* (2013.01)

(56) References Cited

U.S. PATENT DOCUMENTS

2012/0129014 A1   5/2012   Baek et al.
2014/0030562 A1*  1/2014   Ishii .................. H01M 2/22
                                                    429/72

FOREIGN PATENT DOCUMENTS

| EP | 2 105 980 A1 | 9/2009 | |
| EP | 2 581 976 A1 | 4/2013 | |
| EP | 2581967 A2 * | 4/2013 | ............ H01M 2/202 |
| JP | 2009-021171 A | 1/2009 | |
| JP | 2009-146680 A | 7/2009 | |
| JP | 2009-252371 A | 10/2009 | |
| KR | 10-0659866 B1 | 12/2006 | |
| KR | 10-2011-0070443 A | 6/2011 | |
| KR | 10-2011-0094415 A | 8/2011 | |
| KR | 10-2012-0053809 A | 5/2012 | |

OTHER PUBLICATIONS

Korean Office Action dated Mar. 16, 2016.
European Examination Report dated Nov. 9, 2016 in Corresponding European Patent Application No. 15173388.8.
European Examination Report dated Jan. 26, 2018 in Corresponding European Patent Application No. 15173388.8.

* cited by examiner

SECONDARY BATTERY AND SECONDARY BATTERY PACK INCLUDING THE SAME

CROSS-REFERENCE TO RELATED APPLICATION

Korean Patent Application No. 10-2014-0151591, filed on Nov. 3, 2014, in the Korean Intellectual Property Office, and entitled: "Secondary Battery and Secondary Battery Pack Including the Same," is incorporated by reference herein in its entirety.

BACKGROUND

1. Field

One or more exemplary embodiments relate to a secondary battery and a secondary battery pack including the secondary battery.

2. Description of the Related Art

Owing to developments in the fields of wireless Internet and communication technology, distribution of mobile phones and portable computers that may be operated by using a battery without an external power supply device has increased. Mobile phones or portable computers may have a small size and may be easy to carry, and may be being widely used for both business and personal use.

SUMMARY

Embodiments may be realized by providing a secondary battery, including a bare cell including an upper surface having an electrode terminal and side surfaces perpendicular to the upper surface; and a first coverlay and a second coverlay electrically connected to the bare cell, the side surfaces including a pair of first side surfaces that are in parallel with each other, and a pair of second side surfaces connecting the pair of first side surfaces to each other and having a smaller area than that of the pair of first side surfaces, the first coverlay including a first region on the upper surface, and a second region bent perpendicularly from the first region and on one of the pair of the second side surfaces, the second coverlay including a third region on the first region, and a fourth region bent perpendicularly from the third region and on the second region, and the third region being longer than the first region and the second region being longer than the fourth region.

The bare cell may include an electrode assembly including a first electrode plate, a second electrode plate, and a separator between the first electrode plate and the second electrode plate; a can accommodating the electrode assembly and having an opening in a side thereof; and a cap plate sealing the opening of the can. The cap plate may form the upper surface.

The first region may be electrically connected to the cap plate, and the third region may be electrically connected to the electrode terminal.

The electrode terminal and the third region may be electrically connected to each other via a temperature protection device.

At least the second region and the third region in the first coverlay and the second coverlay may be coated by an insulating film.

A first terminal may protrude from an end portion of the second region, a second terminal may protrude from the fourth region and may be separated from the first terminal, and an extension portion extending from the fourth region may be between the first terminal and the second terminal.

A fixing tape may be attached to the extension portion, and the fixing tape may extend to the pair of first side surfaces.

Embodiments may be realized by providing a secondary battery pack, including a plurality of secondary batteries arranged in a first direction in parallel with each other; and a protective circuit module electrically connected to the plurality of secondary batteries, each of the plurality of the secondary batteries including a bare cell; and a first coverlay and a second coverlay electrically connected to the bare cell, the bare cell including an upper surface facing the first direction; a pair of first side surfaces perpendicular to the upper surface in parallel with each other; and a pair of second side surfaces perpendicular to the upper surface and connecting the pair of first side surfaces to each other, the first coverlay including a first region on the upper surface, and a second region bent perpendicularly from the first region and on one of the pair of second side surfaces, a first terminal protruding from an end portion of the second region, the second coverlay including a third region on the first region and a fourth region bent perpendicularly from the third region and on the second region, and a second terminal protruding from the fourth region and separated from the first terminal, the protective circuit module being connected to the first terminal and the second terminal in parallel with the pair of second side surfaces.

The bare cell may include an electrode assembly including a first electrode plate, a second electrode plate, and a separator between the first electrode plate and the second electrode plate; a can accommodating the electrode assembly and having an opening in a side thereof; and a cap plate sealing the opening of the can and including an electrode terminal. The cap plate may form the upper surface.

The third region may be longer than the first region and the second region may be longer than the fourth region, and the first region may be electrically connected to the cap plate and the third region may be electrically connected to the electrode terminal.

The electrode terminal and the third region may be electrically connected to each other via a temperature protection device.

At least the second region and the third region in the first coverlay and the second coverlay may be coated by an insulating film.

An extension portion extending from the fourth region may be between the first terminal and the second terminal.

A fixing tape may be attached to the extension portion, and the fixing tape may extend to the pair of first side surfaces.

The pair of second side surfaces may have a smaller area than the pair of first side surfaces.

Each of the secondary batteries may include a lower surface that is opposite to the upper surface, and the upper surface may face the lower surface of a neighboring secondary battery.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
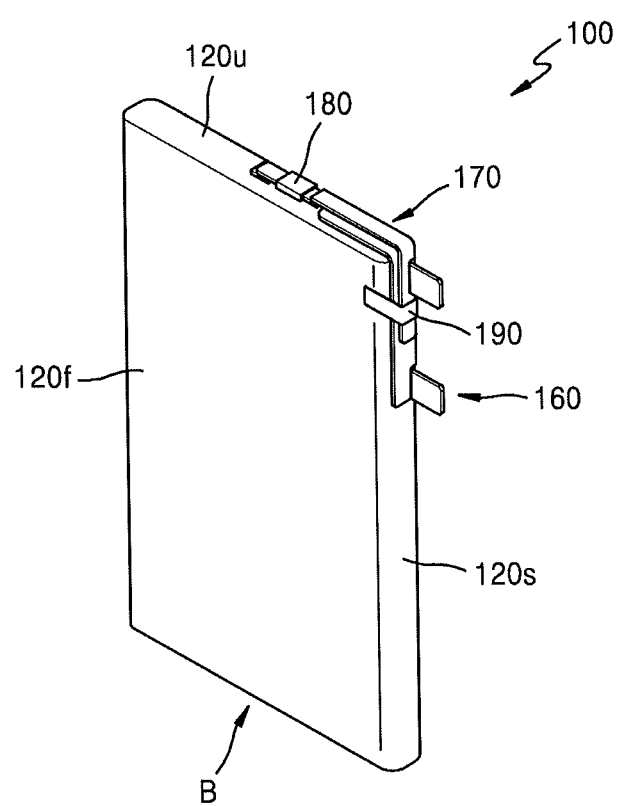
FIG. 1 illustrates a schematic perspective view of a secondary battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Like reference numerals in the drawings denote like elements.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Sizes of components in the drawings may be exaggerated for convenience of explanation. In other words, since sizes and thicknesses of components in the drawings are arbitrarily illustrated for convenience of explanation, the following exemplary embodiments are not limited thereto.

As used herein, the term "and/or" includes any and all combinations of one or more of the associated listed items. Expressions such as "at least one of," when preceding a list of elements, modify the entire list of elements and do not modify the individual elements of the list.

Figure 2:
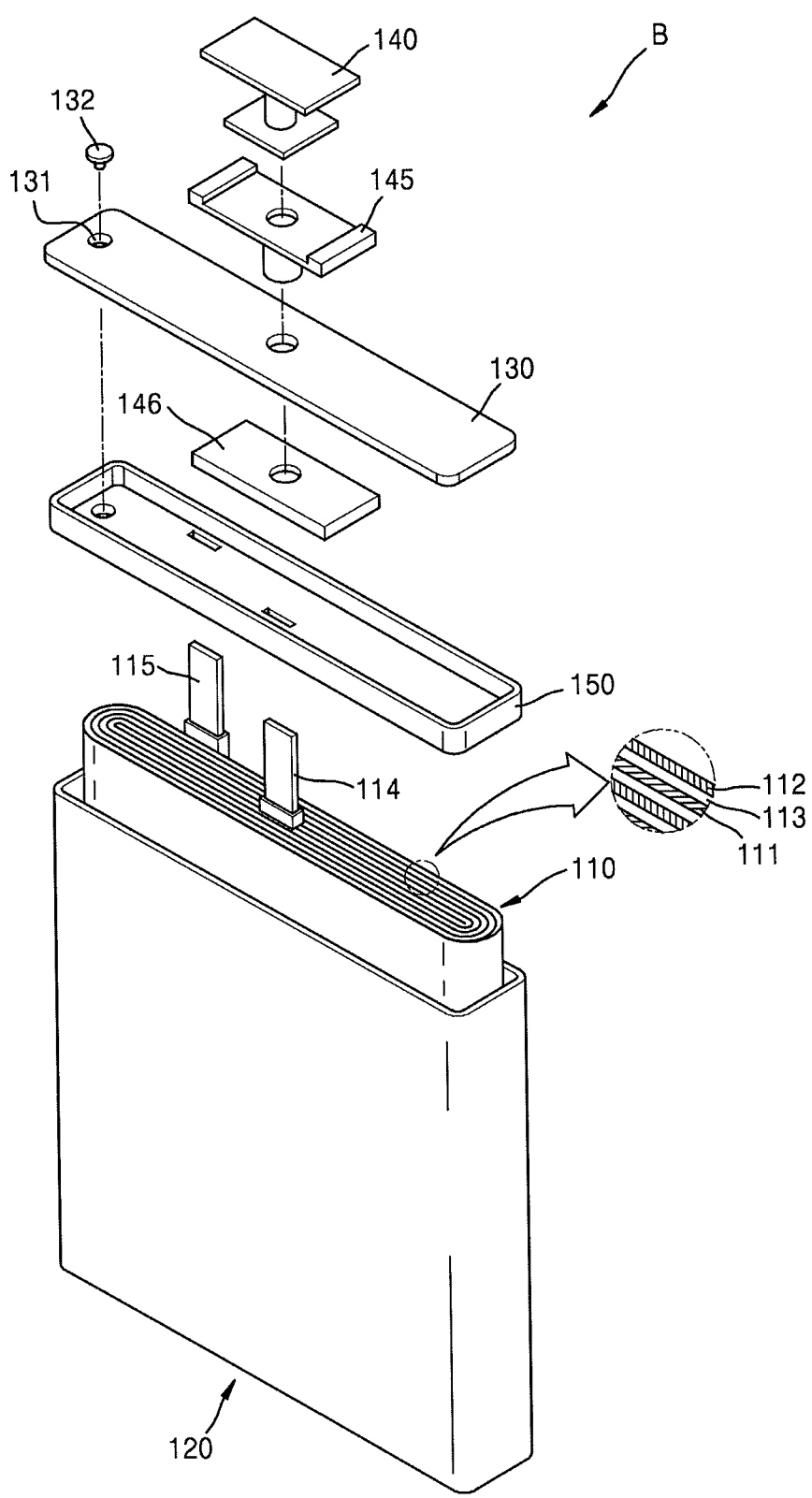
FIG. 2 illustrates an exploded perspective view of a bare cell in the secondary battery of FIG. 1.
Figure 3:
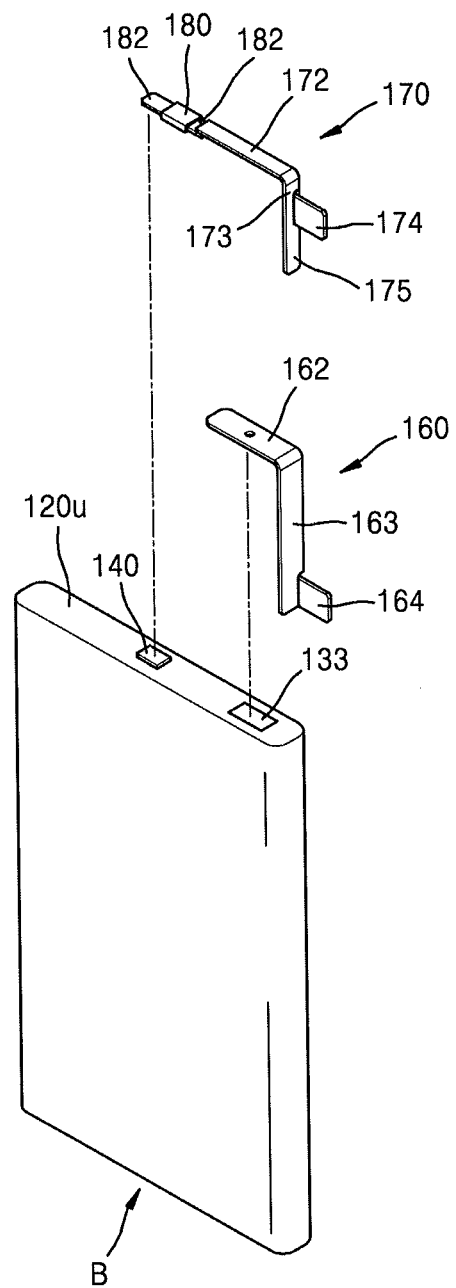
FIG. 3 illustrates an exploded perspective view of a part of the secondary battery of FIG. 1.

FIG. 1 illustrates a schematic perspective view of a secondary battery 100 according to an exemplary embodiment, FIG. 2 illustrates an exploded perspective view of a bare cell in the secondary battery 100 of FIG. 1, and FIG. 3 illustrates an exploded perspective view of a part of the secondary battery 100 of FIG. 1. Referring to FIGS. 1 through 3, the secondary battery 100 according to the present exemplary embodiment may include a bare cell B and a first coverlay 160 and a second coverlay 170 that are electrically connected to the bare cell B.

The bare cell B may be an angular cell including an upper surface 120u and side surfaces 120f and 120s perpendicular to the upper surface 120u. The side surfaces 120f and 120s may include a pair of first side surfaces 120f that are in parallel with each other, and a pair of second side surfaces 120s connecting the pair of first side surfaces 120f to each other and having smaller areas than those of the pair of first side surfaces 120f.

The bare cell B may include an electrode assembly 110, a can 120 in which the electrode assembly 110 is accommodated, and a cap plate 130 sealing inside of the can 120. The first and second surfaces 120f and 120s may be formed by the can 120, and the cap plate 130 may form the upper surface 120u.

The electrode assembly 110 may include a first electrode plate 111 and a second electrode plate 112 on which an electrode active material is applied, and a separator 113 disposed between the first and second electrode plates 111 and 112. The electrode assembly 110 may be manufactured by forming a stacked body, in which the first electrode plate 111, the separator 113, and the second electrode plate 112 are sequentially stacked, and winding the stacked body as a jelly-roll type.

The first and second electrode plates 111 and 112 may be electrically connected respectively to a first electrode tab 114 and a second electrode tab 115 for withdrawing electric charges generated by chemical reactions to outside. The first electrode tab 114 and the second electrode tab 115 may be extended in the same direction. For example, the first and second electrode tabs 114 and 115 may be extended toward the cap plate 130.

In the present exemplary embodiment, the electrode assembly 110 has a jelly-roll shape. In an embodiment, the electrode assembly 110 may have a structure, in which the first electrode plate 111, the second electrode plate 112, and the separator 113 between the first and second electrode plates 111 and 112 are repeatedly stacked.

The can 120 may be formed as a hexagon having an open portion and including the upper surface 120u and a lower surface opposite to the upper surface, and the side surfaces 120f and 120s, and may be formed of a metal material having electric conductivity. A label may be attached to an outer side surface of the can 120, and an insulating plate may be coupled to the lower surface of the can 120.

The electrode assembly 110 impregnated in an electrolyte may be accommodated in the can 120. After the electrode assembly 110 is accommodated in the can 120, an opening formed in a side of the can 120 may be sealed by the cap plate 130. A contact portion between the cap plate 130 and the can 120 may be welded by using laser, and the can 120 may be sealed air-tight.

The cap plate 130 may be formed of the same material as the can 120, and may include an electrolyte injection hole 131. After coupling the cap plate 130 and the can 120 to each other, the electrolyte may be injected through the electrolyte injection hole 131 and the electrolyte injection hole 131 may be sealed by a stopper 132.

An electrode terminal 140 may be disposed on the cap plate 130. An upper surface of the electrode terminal 140 may be exposed to outside, and a lower portion of the electrode terminal 140 may penetrate through the cap plate 130 into the can 120.

The electrode terminal 140 may be electrically connected to the first electrode tab 114 of the electrode assembly 110 to have a first polarity, and the cap plate 130 may be electrically connected to the second electrode tab 115 of the electrode assembly 110 to have a second polarity. The can 120 that may be connected to the cap plate 130 through the welding operation may have the second polarity.

For example, the cap plate 130 may function as a cathode of the secondary battery 100 and the electrode terminal 140 may function as an anode of the secondary battery 100. A first gasket 145 and a second gasket 146 including an insulating material may be disposed between the cap plate 130 and the electrode terminal 140, and short-circuiting between the cap plate 130 and the electrode terminal 140 may be prevented. The first gasket 145 may be disposed to contact the upper surface of the cap plate 130, and the second gasket 146 may be disposed to contact the lower surface of the cap plate 130. In FIG. 2, the first and second gaskets 145 and 146 are shown as separate members. In an embodiment, the first and second gaskets 145 and 146 may be formed integrally with each other.

An insulating element 150 located on the electrode assembly 110 may be disposed in the can 120. The insulating element 150 may insulate the electrode assembly 110 from the cap plate 130. As another example, the insulating element 150 may insulate the electrode assembly 110 from the cap plate 130, and at the same time, may prevent the electrode assembly 110 from moving in the can 120. The insulating element 150 may include a through hole, through which the first and second electrode tabs 114 and 115 may extend toward the cap plate 130. In the present exemplary embodiment, the insulating element 150 is disposed in the can 120. In an embodiment, the insulating element 150 may not be provided in another exemplary embodiment.

The first coverlay 160 and the second coverlay 170 may be disposed while overlapping with each other. For example, the first coverlay 160 may include a first region 162 located on the upper surface 120u, and a second region 163 bent from the first region 162 perpendicularly and located on one of the pair of second side surfaces 120s. The second coverlay 170 may include a third region 172 located above the first region 162, and a fourth region 173 bent perpendicularly from the third region 172 and located above the second region 163.

The first coverlay 160 and the second coverlay 170 may be electrically connected to the bare cell B, and electric charges generated in the bare cell B may be conducted to outside.

For example, the first region 162 may be electrically connected to the cap plate 130, and the third region 172 may be formed to be longer than the first region 162 and may be electrically connected to the electrode terminal 140. The first region 162 may be located between the electrode terminal 140 and the second side surface 120s.

The first terminal 164 may protrude from an end portion of the second region 163, and the second terminal 174 may protrude from the fourth region 173. The second region 163 located at a lower portion may be longer than the fourth region 173, and the first terminal 164 and the second terminal 174 may be isolated from each other.

The cap plate 130 may form the upper surface 120u, and an insulating tape exposing the electrode terminal 140 and a connection portion 133 that is a part of the cap plate 130 may be attached to the cap plate 130.

The first region 162 may be attached to the connection portion 133 through a welding process, and the third region 172 may be electrically connected to the electrode terminal 140 via a temperature protection device 180.

The temperature protection device 180 may block current flow when the bare cell B is overheated to a predetermined temperature or higher, and ignition or explosion of the bare cell B may be prevented. The temperature protection device 180 may include a body that is reversible between conductivity and insulation according to the temperature, and lead terminals 182 formed at opposite sides of the body. The body may be, for example, a polymer positive temperature coefficient (PTC) in which conductive particles such as metal particles or carbon particles are distributed in a crystalline polymer, a fuse, a current blocking device, or a bi-metal.

One lead terminal 182 of the temperature protection device 180 may be attached to the third region 172 through a welding process, and the other lead terminal 182 may be attached to the electrode terminal 140 through the welding process.

The first coverlay 160 and the second coverlay 170 may be coated by an insulating film, and a short between the first coverlay 160 and the second coverlay 170 that overlap with each other may be prevented from being generated. The third region 172 that may be longer than the first region 162 and the second region 163 that may be longer than the fourth region 173 may be coated by the insulating film in consideration of heat generation.

An extension portion 175 may be further formed on the fourth region 173 toward the first terminal 164. The extension portion 175 may be located between the first terminal 164 and the second terminal 165, and a fixing tape 190 may be attached to the extension portion 175. The fixing tape 190 may extend to the pair of first side surfaces 120f, and locations of the first coverlay 160 and the second coverlay 170 may be fixed.

As described above, the first coverlay 160 and the second coverlay 170 may overlap with each other, a distance that the electric charges move may be reduced, and the secondary battery 100 may be formed to have a compact size.

Figure 4:
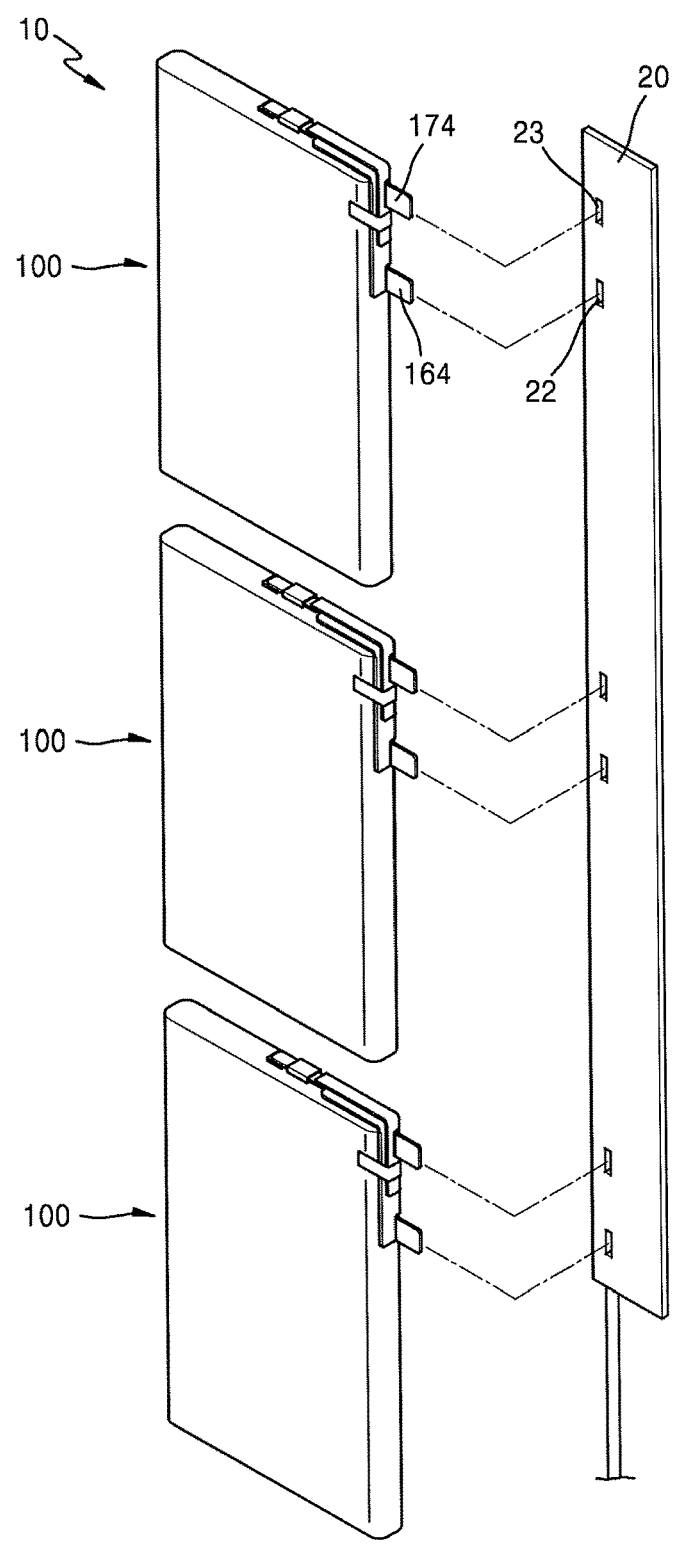
FIG. 4 illustrates a schematic diagram of a secondary battery pack according to another exemplary embodiment.

FIG. 4 illustrates a schematic diagram of a secondary battery pack 10 according to an exemplary embodiment. Hereinafter, the secondary battery pack 10 according to the present exemplary embodiment will be described below with reference to FIGS. 1 through 4.

The secondary battery pack 10 may include a plurality of secondary batteries 100 that are arranged in parallel with each other in first direction, and a protective circuit module 20 electrically connected to the plurality of secondary batteries 100.

The plurality of secondary batteries 100 may be arranged so that, for example, the upper surfaces thereof may face the first direction. The cap plate 130 of the secondary battery 100 may face the lower surface of a neighboring secondary battery 100.

Each of the plurality of secondary batteries 100 may include the bare cell B, and the first coverlay 160 and the second coverlay 170 that are electrically connected to the bare cell B. The first coverlay 160 and the second coverlay 170 may overlap with each other. For example, the first coverlay 160 may include the first region 162 and the second region 163 that are bent from each other at an angle of 90°, and the second coverlay 170 may include the third region 172 and the fourth region 173 that are bent from each other at an angle of 90°.

For example, the bare cell B may include the upper surface 120u, the pair of first side surfaces 120f arranged perpendicularly to the upper surface 120u and in parallel with each other, and the pair of second side surfaces 120s that are perpendicular to the upper surface 120u and connect the pair of first side surfaces 120f. The first region 162 may be located on the upper surface 120u, and the second region 163 may be located on one of the second side surfaces 120s. The third region 172 and the fourth region 173 may be respectively located on the first region 162 and the second region 163.

The third region 172 may be longer than the first region 162, the second region 162 may be longer than the fourth region 173, and at least the second region 162 and the third region 172 may be coated with the insulating film to insulate the first coverlay 160 and the second coverlay 170 from each other, wherein the first and second coverlays 160 and 170 overlap with each other.

The first region 162 may be electrically connected to the cap plate 130, and the third region 172 may be longer than the first region 162 and electrically connected to the electrode terminal 140. The first terminal 164 may protrude from the end portion of the second region 163, and the second terminal 174 may protrude from the fourth region 173. The second region 163 located at a lower portion may be longer than the fourth region 173, and the first terminal 164 and the second terminal 174 may be separated from each other. The first terminal 164 and the second terminal 174 may protrude perpendicularly to the first direction.

The extension portion 175 may be further formed on the fourth region 173 toward the first terminal 164. The extension portion 175 may be located between the first terminal 164 and the second terminal 174, and the fixing tape 190 may be attached to the extension portion 175. The fixing tape 190 may extend to the pair of first side surfaces 120f, and the first coverlay 160 and the second coverlay 170 may be firmly fixed at their positions.

The protective circuit module 20 may be electrically connected to the plurality of secondary batteries, and overheating and explosion that may be generated by an overcharge, an overdischarge, or an overcurrent of the plurality of secondary batteries 100 may be prevented. The protective circuit module 20 may include a safety device including a resistor and a passive device such as a condenser or an active device such as a field effect transistor (FET), or a protective device on which integrated circuits (ICs) may be selectively formed.

The protective circuit module 20 may include a first terminal recess 22 and a second terminal recess 23 to which the first terminal 164 and the second terminal 174 may be inserted, and may be arranged in parallel with the pair of second side surfaces 120s.

As described above, the first coverlay 160 and the second coverlay 170 may overlap with each other, the distance the electric charges move may be reduced, and a risk of generating a short-circuit with neighboring secondary batteries 100 may be reduced. The separation distance between the first terminal 164 and the second terminal 174 may be reduced, and a size of the protective circuit module 20 may be reduced, and a slim type secondary battery pack 10 may be manufactured.

By way of summation and review, a mobile phone may include a single secondary battery, and the mobile phone may be used in various spaces without regard to a power supply device. A portable computer may include an external/internal secondary battery pack, and the portable computer may be used in various spaces without regard to a power supply device. The external/internal secondary battery pack may include a plurality of secondary batteries that may be repeatedly charged/discharged, and the plurality of secondary batteries may be connected to each other in series and/or in parallel without short-circuiting.

As described above, according to the one or more of the above exemplary embodiments, a compact secondary battery that may be capable of minimizing the distance electric charges move and a secondary battery pack of slim type may be manufactured.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A secondary battery, comprising:
    a bare cell including an upper surface having an electrode terminal and a connection portion and side surfaces perpendicular to the upper surface;
    a first coverlay and a second coverlay electrically connected to the bare cell; and
    a fixing tape fixing locations of the first coverlay and the second coverlay, wherein
    the side surfaces include a pair of first side surfaces that are in parallel with each other, and a pair of second side surfaces connecting the pair of first side surfaces to each other and having a smaller area than that of the pair of first side surfaces, wherein
    the first coverlay includes a first region on the upper surface, and a second region bent from the first region and on one of the pair of second side surfaces, wherein
    the second coverlay includes a third region on the first region, a fourth region bent from the third region and on the second region, and an extension portion extending from the fourth region, wherein
    the third region of the second coverlay is longer than the first region of the first coverlay and the second region of the first coverlay is longer than the fourth region of the second coverlay, and wherein
    the first region of the first coverlay is coupled to the connection portion of the upper surface of the bare cell and is between the connection portion of the upper surface of the bare cell and the third region of the second coverlay.

2. The secondary battery as claimed in claim 1, wherein the bare cell includes:
    an electrode assembly including a first electrode plate, a second electrode plate, and a separator between the first electrode plate and the second electrode plate;
    a can accommodating the electrode assembly and having an opening in a side thereof; and
    a cap plate sealing the opening of the can,
    wherein the cap plate forms the upper surface.

3. The secondary battery as claimed in claim 2, wherein the first region is electrically connected to the cap plate, and the third region is electrically connected to the electrode terminal.

4. The secondary battery as claimed in claim 3, wherein the electrode terminal and the third region are electrically connected to each other via a temperature protection device.

5. The secondary battery as claimed in claim 3, wherein at least the second region and the third region in the first coverlay and the second coverlay are coated by an insulating film.

6. The secondary battery as claimed in claim 3, wherein a first terminal protrudes from an end portion of the second region, a second terminal protrudes from the fourth region and is separated from the first terminal, and the extension portion of the second coverlay is between the first terminal and the second terminal, and wherein
    the fixing tape is between the first and second terminals.

7. A secondary battery pack, comprising:
a plurality of secondary batteries arranged in a first direction in parallel with each other; and
a protective circuit module electrically connected to the plurality of secondary batteries, wherein
each of the plurality of the secondary batteries includes:
a bare cell; and
a first coverlay and a second coverlay electrically connected to the bare cell, wherein
the bare cell includes:
an upper surface having a connection portion;
a pair of first side surfaces perpendicular to the upper surface in parallel with each other; and
a pair of second side surfaces perpendicular to the upper surface and connecting
the pair of first side surfaces to each other, wherein
the first coverlay includes a first region on the upper surface, a second region bent from the first region and on one of the pair of second side surfaces, and a first terminal protruding from an end portion of the second region, wherein:
the second coverlay includes a third region on the first region, a fourth region bent from the third region and on the second region,
a second terminal protrudes from the fourth region, and
an extension portion extends from the fourth region, wherein:
the third region is longer than the first region,
the second region is longer than the fourth region,
the second terminal is separated from the first terminal, and
the extension portion is between the first terminal and the second terminal, wherein
a fixing tape is attached to the extension portion to fix locations of the first coverlay and the second coverlay, wherein
the protective circuit module is connected to the first terminal and the second terminal in parallel with the pair of second side surfaces, and wherein
the first region of the first coverlay is coupled to the connection portion of the upper surface of the bare cell and is between the connection portion of the upper surface of the bare cell and the third region of the second coverlay.

8. The secondary battery pack as claimed in claim 7, wherein the bare cell includes:
an electrode assembly including a first electrode plate, a second electrode plate, and a separator between the first electrode plate and the second electrode plate;
a can accommodating the electrode assembly and having an opening in a side thereof; and
a cap plate sealing the opening of the can and including an electrode terminal,
wherein the cap plate forms the upper surface.

9. The secondary battery pack as claimed in claim 8, wherein the first region is electrically connected to the cap plate and the third region is electrically connected to the electrode terminal.

10. The secondary battery pack as claimed in claim 9, wherein the electrode terminal and the third region are electrically connected to each other via a temperature protection device.

11. The secondary battery pack as claimed in claim 9, wherein
at least the second region and the third region in the first coverlay and the second coverlay are coated by an insulating film.

12. The secondary battery pack as claimed in claim 7, wherein the fixing tape extends to cover opposite sides of the extension portion of the second coverlay and the pair of first side surfaces.

13. The secondary battery pack as claimed in claim 7, wherein the pair of second side surfaces have a smaller area than the pair of first side surfaces.

14. The secondary battery pack as claimed in claim 7, wherein each of the secondary batteries includes a lower surface that is opposite to the upper surface, and the upper surface faces the lower surface of a neighboring secondary battery.

15. The secondary battery pack as claimed in claim 7, wherein the second region of the first coverlay and the fourth region of the second coverlay extend on the one of the pair of second side surfaces in the first direction.

16. The secondary battery as claimed in claim 1, wherein
the first region of the first coverlay includes a first surface and a second surface opposite to the first surface, and wherein:
the first surface of the first region of the first coverlay is coupled to the connection portion of the upper surface of the bare cell, and
the second surface of the first region of the first coverlay is covered by the third region of the second coverlay.

17. The secondary battery as claimed in claim 3, wherein the connection portion of the upper surface of the bare cell is closer to the one of the pair of second side surfaces than the electrode terminal of the bare cell.

* * * * *